United States Patent [19]

Burnett

[11] 4,280,367
[45] Jul. 28, 1981

[54] GEARLESS QUADROPHASOR

[76] Inventor: Jerry L. Burnett, 11323 Sageland, Houston, Tex. 77089

[21] Appl. No.: 54,576

[22] Filed: Jul. 2, 1979

[51] Int. Cl.³ .................... F16H 21/18; F16H 21/34
[52] U.S. Cl. ............................................. 74/42; 74/51
[58] Field of Search ...................... 74/42, 43, 44, 51

[56] References Cited

U.S. PATENT DOCUMENTS

| 511,924 | 1/1894 | Barnett | 74/68 X |
| 883,024 | 3/1908 | Humpert | 74/42 |
| 1,622,378 | 3/1927 | Graupner | 74/43 |
| 1,897,182 | 2/1933 | Terhaar | 74/51 |
| 2,228,400 | 1/1941 | Otto | 74/43 |

FOREIGN PATENT DOCUMENTS

| 32107 | 4/1927 | France | 74/51 |
| 692133 | 6/1930 | France | 74/68 |
| 565156 | 10/1944 | United Kingdom | 74/42 |

Primary Examiner—Lawrence J. Staab

[57] ABSTRACT

A link and pivot mechanism is provided in which a pair of equal length links are connected pivotally at centers. The movement of these two links is scissor-like and is precisely controlled by the complete mechanism to produce four cycles per revolution. In one embodiment, said links osscilate about an imaginary fixed diagonal line while an interconnected crankshaft rotates. In another embodiment, said crankshaft is fixed and the mechanical approximation of said diagonal line rotates even as said scissor links osscilate about said diagonal line. Either embodiment provides a precisely controlled relationship between the crank angle (the angle between the crankshaft throw and said diagonal line) and the two angles between said scissor links. This relationship provides for a four cycle single revolution displacement mechanism, with four displacement regions, in which all movement is that of pivoting links.

4 Claims, 4 Drawing Figures

GEARLESS QUADROPHASOR

A summary of the invention follows:

The present invention relates to displacement machines and more specifically to those machines having four displacement cycles in a single revolution. In contrast with two cycle displacement machines, which can use the common slide and crank mechanism for producing the two cycles, four cycle machines use chain drives or some point-contact mechanism (gears, cams, non-linear slide guides, etc.) to produce the desired four cycles per revolution. Such mechanisms are not precise, forcing machine designs which allow for unpredictable variations in the resulting cycles, and wear prematurely unless their size is unduly bulky with respect to the masses they control.

This invention provides for precision control over the displacing masses by using a linkage mechanism consisting entirely of pivots and links. Since there is no point-contact movement nor chains, the design considerations can be drawn from known principles of bearing construction.

The objective of this invention is to provide a mechanism, consisting solely of links and pivots, to cause four cycles of displacement per revolution.

Figure 4:
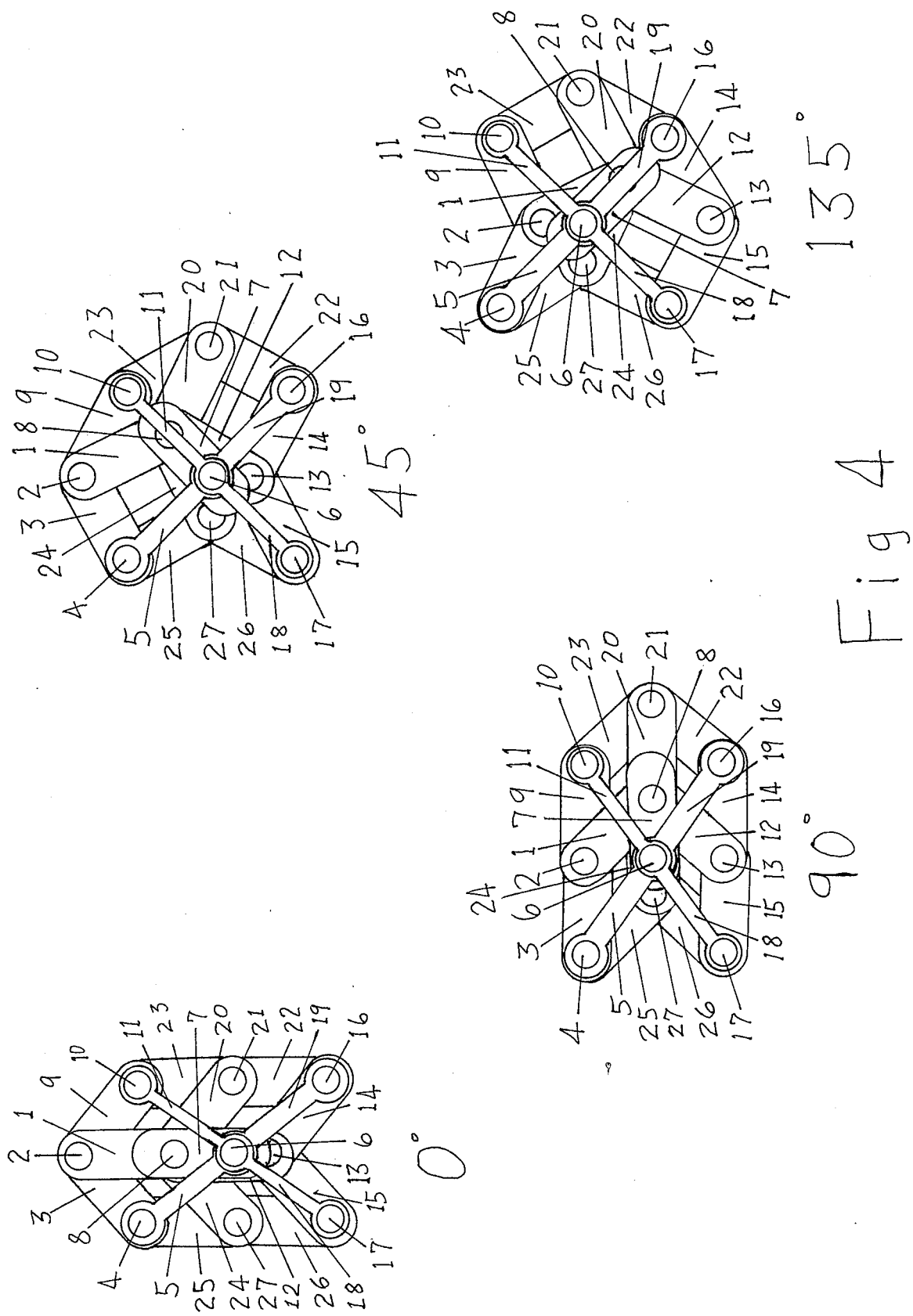
FIG. 4 shows four frames of the fifteen-bar quadrophasor at displacement angles from 0 degrees to 135 degrees at 45 degree increments.

Refering to FIG. 4, the 0 degree frame, the following parts are identified:

(1) THROW LINK
(2) PHASOR PIVOT
(3) PHASOR LINK
(4) WRIST PIVOT
(5) RADIAL ARM
(6) CRANK PIVOT
(7) THROW ARM
(8) THROW PIVOT
(9) RIGHT HAND PHASOR LINK
(10) WRIST PIVOT #2
(11) RADIAL ARM #2
(12) THROW LINK #3
(13) PHASOR PIVOT #3
(14) PHASOR LINK #3
(15) RIGHT HAND PHASOR LINK #3
(16) WRIST PIVOT #3
(17) WRIST PIVOT #4
(18) RADIAL ARM #4
(19) RADIAL ARM #3
(20) THROW LINK #2
(21) PHASOR PIVOT #2
(22) RIGHT HAND PHASOR LINK #2
(23) PHASOR LINK #2
(24) THROW LINK #4
(25) RIGHT HAND PHASOR LINK #4
(26) PHASOR LINK #4
(27) PHASOR PIVOT #4

Figure 1:
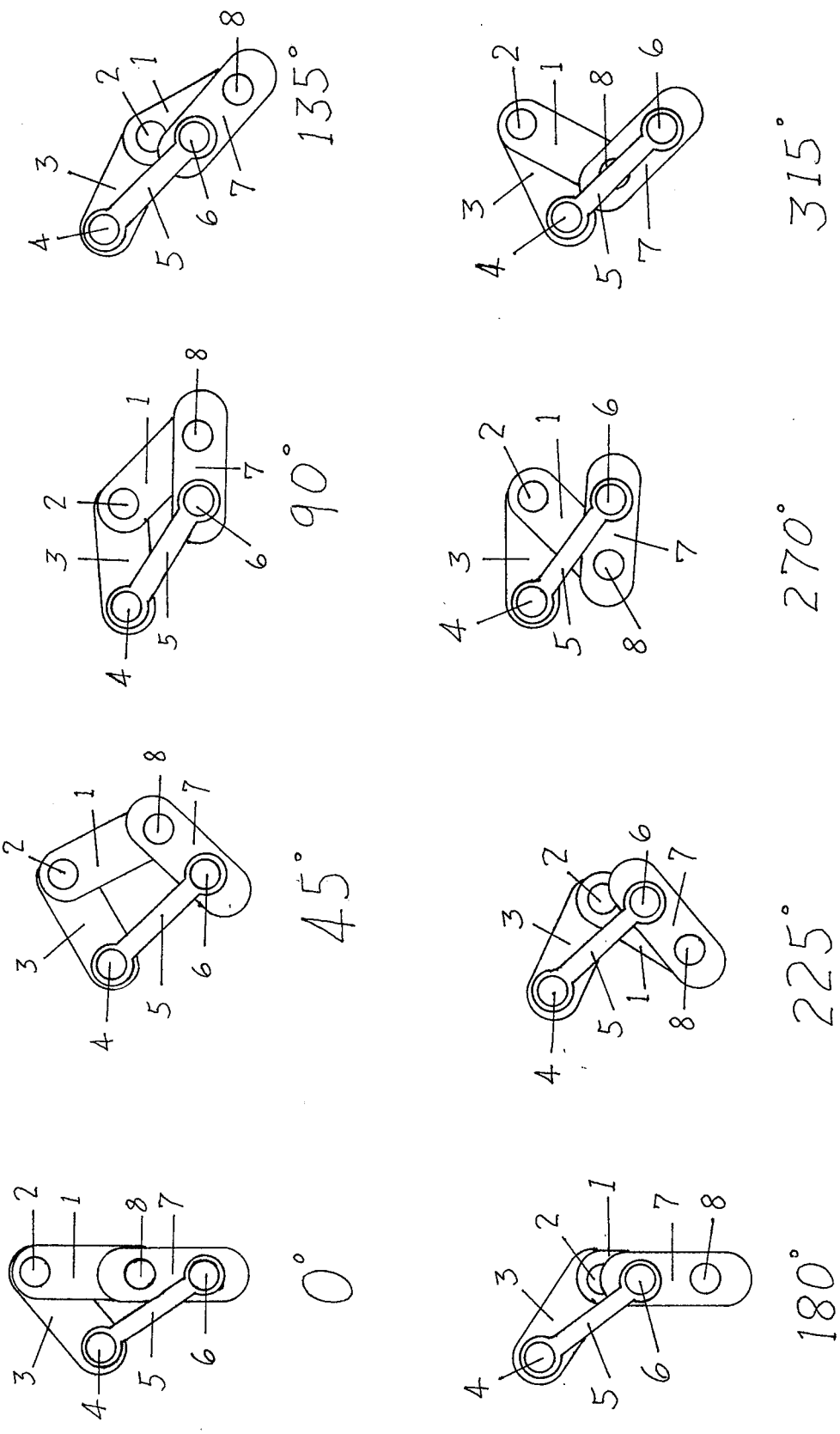
FIG. 1 shows eight frames of the fundamental Four-bar quadrophasor at displacement angles from 0 degrees to 315 degrees at 45 degree increments.

The detailed description follows:

The mechanism depicted in the eight frames of FIG. 1 is the HALF QUADROPHASOR QUARTER SUPPORT. This is the fundamental mechanism on which the FULL QUADROPHASOR FULL SUPPORT is constructed. It is a four bar link and pivot mechanism in which the lengths of the links are proportioned by a special formula which I call the quadrophasor formula. This formula can be expressed using math symbols as follows:

Let T represent the length of the THROW ARM (7) ((i.e., the distance from the center of the CRANK PIVOT (6) to the center of the THROW PIVOT (8)), likewise let R represent the length of the RADIAL ARM (5), let L represent the length of the THROW LINK (1), and let P represent the length of the PHASOR LINK (3), then the quadrophasor formula says that L=P and that $$2L^2 = T^2 + R^2.$$

In common english, this reads that the sum of the square of the length of the shortest link with the square of the length of the longest link is equal to twice the square of the length of either of the other links, which are equal in length. Any four bar link and pivot mechanism, the length of whose links are so proportioned according to this formula, and whose function is to produce four displacement cycles per revolution, is a HALF QUADROPHASOR QUARTER SUPPORT, as claimed later with this patent application.

The eight frames of FIG. 1 demonstrate the movement throughout one complete revolution. An imaginary line drawn from the CRANK PIVOT (6) through the PHASOR PIVOT (2) is used as a reference line and is called the diagonal line. The diagonal line is not represented by a mechanical link. The angle formed clockwise between the diagonal line and a line drawn from the CRANK PIVOT (6) through the THROW PIVOT (8) (i.e., along the THROW LINK (7)) is called the rotation angle. The eight frames presented in FIG. 1 are at rotation angles of 0 degrees, 45 degrees, 90 degrees, 135 degrees, 180 degrees, 225 degrees, 270 degrees, and 315 degrees. The angle formed between the diagonal line and a line drawn through the CRANK PIVOT (6) and the WRIST PIVOT (4) (i.e., along the RADIAL ARM (5)) is called the displacement angle, and is the angle which proceeds in four cycles through the revolution. The displacement angle can be seen in FIG. 1 to be a minimum at rotation angles of 0 degrees and 180 degrees, and a maximum at rotation angles of 90 degrees and 270 degrees.

The four cycles thus produced are the subject of this invention. However, it is the special way in which the displacement angle behaves, with respect to the rotation angle, that makes the mechanically more sound FULL QUADROPHASOR FULL SUPPORT possible. This behavior can be expressed mathematically, if we let $\Delta$ represent the displacement angle and $\theta$ represent the rotation angle, as follows:

$$\cos^2 \Delta = \cos^2 \theta (2(L/R)^2 - 1) - (L/R)^2 + 1,$$

where L and R are as defined in the quadrophasor formula.

This is the quadrophasor displacement formula, which calculates the value of the displacement angle as the rotation angle ranges from 0 degrees to 360 degrees—one full revolution. This formula shows the following five important properties of the displacement angle:

(1) The value of the displacement angle is a minimum at rotation angles of 0 degrees and 180 degrees, and a maximum at 90 degrees and 270 degrees;

(2) These two minimums are the same and the two maximums are the same;

(3) The displacement angle is always increasing for rotation angles ranging from 0 degrees up to 90 degrees and always decreasing for rotation angles ranging from 90 degrees up to 180 degrees;

(4) The value of the displacement angle for any rotation angle between 0 degrees and 180 degrees is identical to the value of the displacement angle for that same rotation angle between 180 degrees and 360 degrees; i.e., put more rigorously in mathematical terms, if $f(\theta)$ represents the value of the displacement angle for a rotation angle $\theta$, then $$f(\theta)=f(\theta+180);$$

(5) Each cycle is always a 90 degree complement with the previous cycle; i.e., in rigorous mathematical language, $$f(\theta)+f(\theta+90)=90,$$

where $f(\theta)$ is as defined in property (4).

Figure 2:
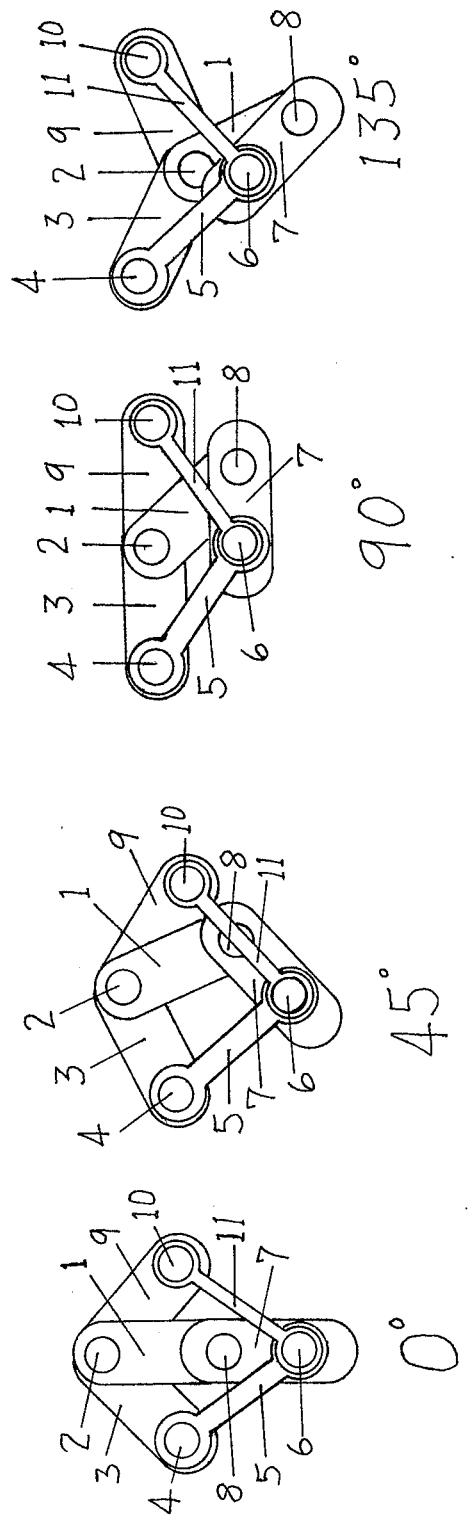
FIG. 2 shows eight frames of the six-bar quadrophasor at displacement angles from 0 degrees to 315 degrees at 45 degree increments.
Figure 2:
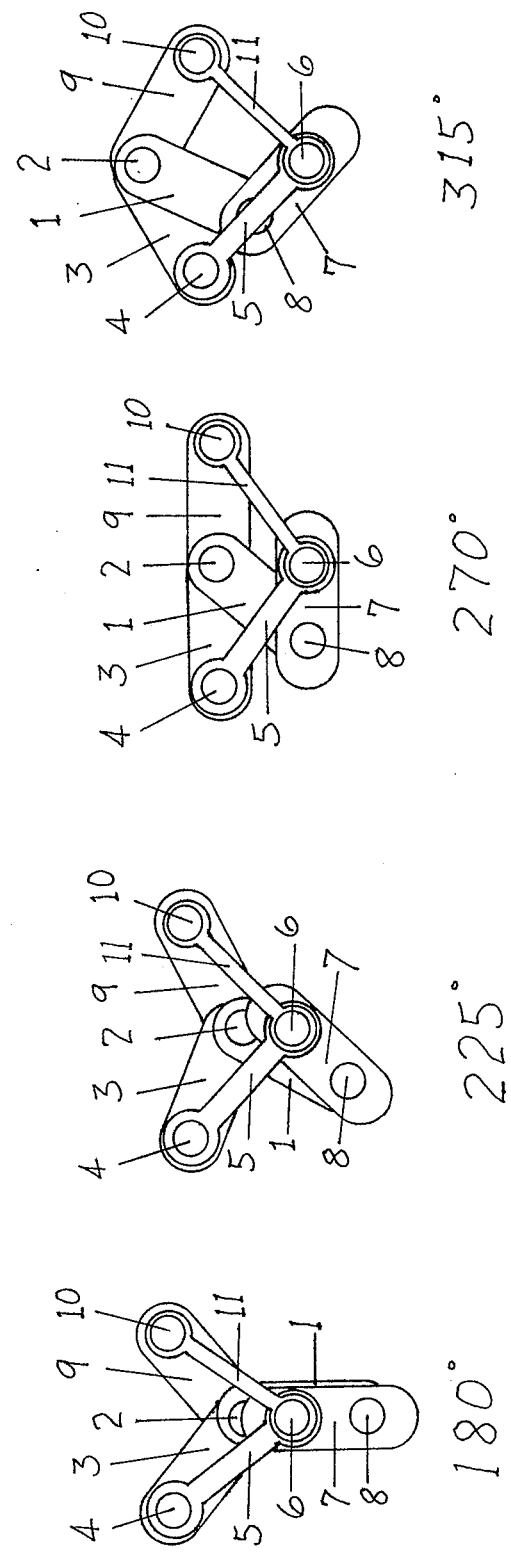

If the HALF QUADROPHASOR QUARTER SUPPORT in FIG. 1 is enhanced with a second radial arm, RADIAL ARM #2 (11), and RIGHT HAND PHASOR LINK (9) connected as shown in the eight frames of FIG. 2, the improved mechanism, called the FULL QUADROPHASOR QUARTER SUPPORT, provides for a larger angle, equal in value to twice the displacement angle, called the stroke angle. It is the acute angle between the two radial arms, and its behavior has the same five important properties previously mentioned for the displacement angle, with the exception that in property (5) the stroke angles in adjacent cycles are 180 degree complements of one another instead of 90 degree complements. The stroke angle, in addition to being twice the displacement angle, is more useful mechanically because the two sides of the angle are represented by mechanical links to which other mechanical parts may be attached.

The eight frames of FIG. 2 show the mechanism's relative positions at rotation angles of 0 degrees, 45 degrees, 90 degrees, 135 degrees, 180 degrees, 225 degrees, 270 degrees, and 315 degrees. The visual demonstration of the four cycles is thus presented for a full revolution.

Figure 3:
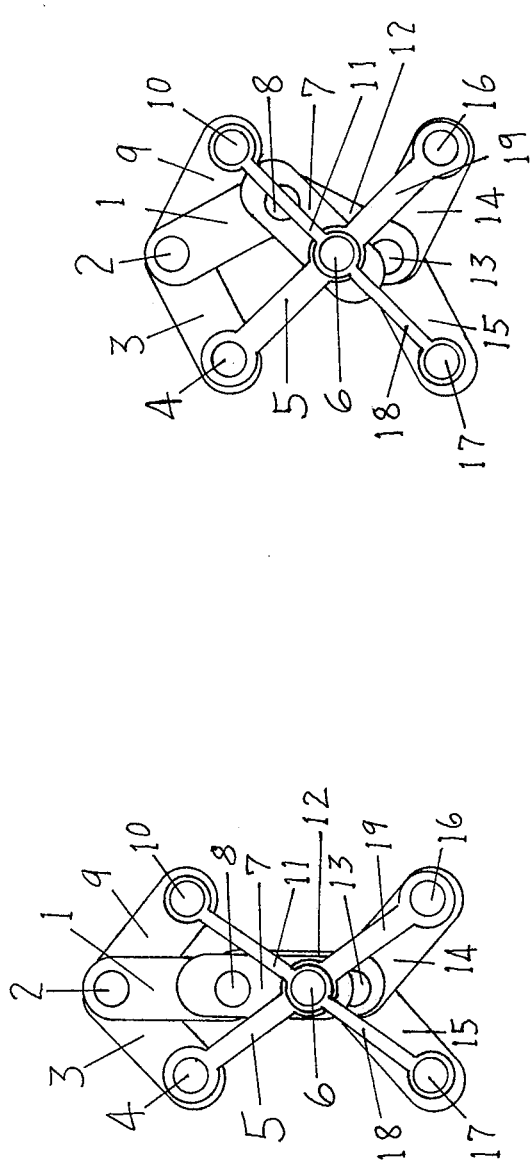
FIG. 3 shows four frames of the nine-bar quadrophasor at displacement angles from 0 degrees to 135 degrees at 45 degree increments.
Figure 3:
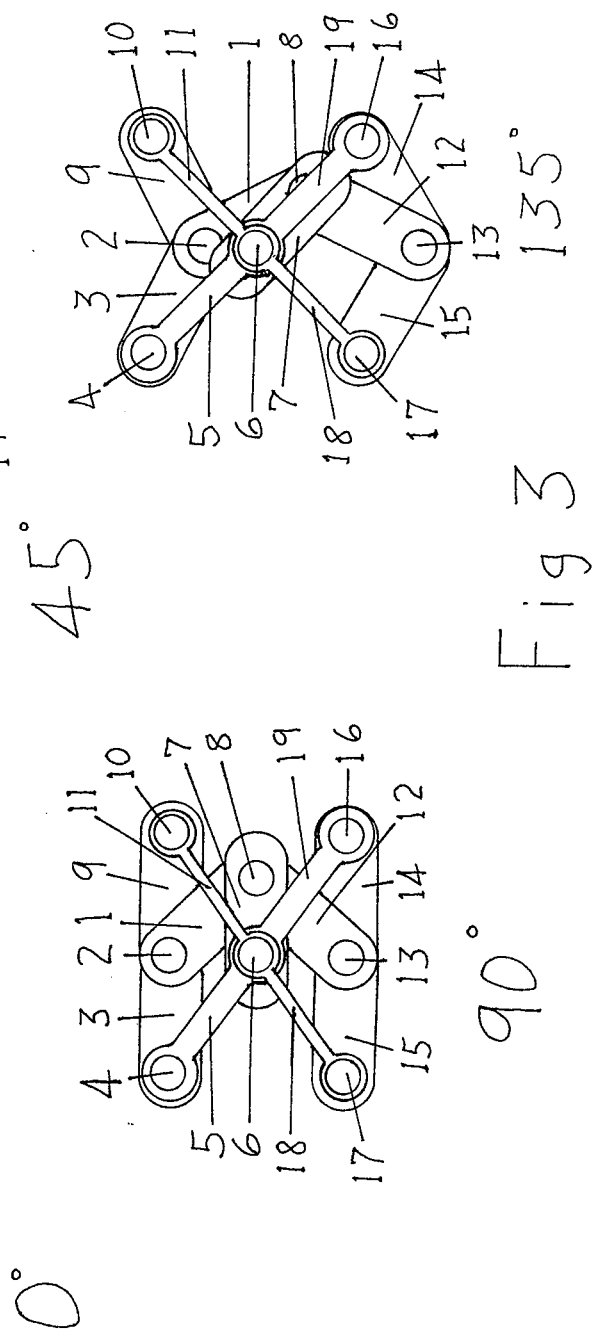

In FIG. 3 RADIAL ARM #3 (19) and RADIAL ARM #4 (18) are added and mechanically fastened to the RADIAL ARM (5) and RADIAL ARM #2 (11), respectively, as shown. These mechanical links form the equal length links, pivoted at centers, mentioned in the abstract which move in a scissor like fashion. An additional throw link, THROW LINK #3 (12), is pivoted with the THROW PIVOT (8) at one end and with two additional phasor links, PHASOR LINK #3 (14) and RIGHT HAND PHASOR LINK #3 (15), at the other end around PHASOR PIVOT #3 (13). PHASOR LINK #3 (14) is pivoted at its other end with RADIAL ARM #3 (19) at WRIST PIVOT #3 (16). RIGHT HAND PHASOR LINK #3 (15) is pivoted at its other end with RADIAL ARM #4 (18) at WRIST PIVOT #4 (17).

This mechanism, called the FULL QUADROPHASOR HALF SUPPORT, provides for three additional stroke angles, defined as follows: stroke angle #2 is the angle formed between RADIAL ARM #2 (11) and RADIAL ARM #3 (19), stroke angle #3 is the angle formed between RADIAL ARM #3 (19) and RADIAL ARM #4 (18), and stroke angle #4 is the angle formed between RADIAL ARM #4 (18) and the RADIAL ARM (5). It should be noted that stroke angle #3 is the same as the stroke angle, that stroke angle #2 is the same as stroke angle #4, and that the stroke angle is always a 180 degree compliment of stroke angle #2.

The structure then upholds the five important properties as set forth in the discussion of FIG. 1, with property 5 modified for stroke angle instead of displacement angle.

FIG. 3 only presents four frames—for rotation angles less than or equal to 180 degrees—because the structure is equivalent for angles of 180 degrees to 360 degrees.

The enhancement brought on by the additional links introduced in FIG. 3 is to insure that any imprecision in the resulting stroke angle is never greater between rotation angles of 90 degrees to 270 degrees than for the same stroke angle between rotation angles of 270 degrees to 90 degrees (clockwise). No real pivot is a perfect fit, so some looseness is always present. In FIG. 2 it can be seen that, for a given looseness in the PHASOR PIVOT (2), the resulting imprecision in the stroke angle would be greater for rotation angles of 90 degrees to 270 degrees (greatest at 180 degrees) than between 270 degrees to 90 degrees. The additional links and pivots in FIG. 3 overcome that drawback.

FIG. 4 depicts the fully developed quadrophasor, called the FULL QUADROPHASOR FULL SUPPORT. The term QUADROPHASOR will generally mean the structure depicted in the four frames of FIG. 4. Following is a description of the additional links and their connecting pivots for FIG. 4.

RIGHT HAND PHASOR LINK #2 (22), PHASOR LINK #2 (23), and THROW LINK #2 (20) are all connected pivotally at PHASOR PIVOT #2 (21), with the RIGHT HAND PHASOR LINK #2 (22) connected at its other end to WRIST PIVOT #3 (16), PHASOR LINK #2 (23) connected at its other end to WRIST PIVOT #2 (10), and THROW LINK #2 (20) connected at its other end to the THROW PIVOT (8).

RIGHT HAND PHASOR LINK #4 (25), PHASOR LINK #4 (26), and THROW LINK #4 (24), are all connected pivotally at PHASOR PIVOT #4 (27), with RIGHT HAND PHASOR LINK #4 (25) connected at its other end to the WRIST PIVOT (4), PHASOR LINK #4 (26) connected at its other end to WRIST PIVOT #4 (17), and THROW LINK #4 (24) connected at its other end to the THROW PIVOT (8).

This structure repeats itself every 90 degrees, although FIG. 4 shows four frames for 0 degrees, 45 degrees, 90 degrees, and 135 degrees. The advantage of having the additional links is to insure that the imprecision in the stroke angle due to non-perfect fitting pivots is never greater than that produced between rotation angles of −45 degrees and +45 degrees.

Having thus described the invention, I now present the claims.

I claim:

1. I claim the invention of a link and pivot mechanism for providing an oscillating output relative to a continuous rotary input comprising:

a. a first link (1) having one end pivotally connected to one end of a second link (3) at a first pivot (2), said first and second links (1,3) being of equal length, b. a throw arm (7) rotating about an axis (6) and being of a length shorter than the length of said first and second links (1,3), said first link (1) having an opposite end pivotally connected to an opposite end of said throw arm (7) at a second pivot (8), c. a third link (5) having one end pivotally connected to an opposite end of said second link (3) at a third pivot (4) and also being pivotally connected to said throw arm (7) at said axis (6), the length of said third link (5) being greater than the length of said first and second links (1,3), d. the lengths of the links (1,3,5) and throw arm (7) being proportioned such that the sum of the square of the length of said first link (1) plus the square of the length of said second link (3) equals the sum of the square of the length of said throw arm (7) plus the square of the length of said third link (5), e. said first pivot (2) and said axis (6) being connected together by an imaginary line, said throw arm (7) defining with said imaginary line a rotation angle as said throw arm (7) rotates about said axis (6), said third link (5) defining with said imaginary line a displacement angle which varies as said throw arm (7) rotates, whereby said rotation angle and said displacement angle exhibit the following properties:

1. the value of the displacement angle is a minimum at rotation angles of 0 degrees and 180 degrees, and a maximum at 90 degrees and 270 degrees,
2. for each complete revolution of the throw arm (7) the displacement angle goes through two minimum values of equal magnitude and two maximum values of equal magnitude,
3. the displacement angle is always increasing for rotation angles from 0 degrees to 90 degrees, and always decreasing for rotation angles from 90 degrees to 180 degrees,
4. the displacement angle for any rotation angle between 0 degrees to 180 degrees is the same as the displacement angle for a subsequent rotation angle 180 degrees greater than the first rotation angle, and
5. the displacement angle for any rotation angle between 0 degrees and 90 degrees is a 90 degree complement of the resulting displacement angle at a subsequent rotation angle 90 degrees greater than the first rotation angle.

2. I claim the invention of a link and pivot mechanism for providing opposing oscillating outputs relative to a continuous rotary input comprising, a. all the elements of claim 1 connected as therein described, and, b. a fourth link (9), equal in length to said first link (1), connected pivotally at one end to said first link (1) and said second link (3) at said first pivot (2), c. a fifth link (11), equal in length to said third link (5), connected pivotally at one end to an opposite end of said fourth link (9) at a fourth pivot (10), and connected pivotally at an opposite end to said third link (5) and said throw arm (7) at said axis (6), said fifth link (11) defining with said third link (5) a stroke angle, whereby the value of said stroke angle, produced by any selected rotation angle, is twice the value of that said displacement angle produced by the same said rotation angle.

3. I claim the invention of a link and pivot mechanism for providing opposing oscillating outputs relative to a continuous rotary input as described in claim 2, with the enhancement that the angular error of any selected stroke angle, due to uniformly non-perfect fitting pivots, will be the same regardless of the rotation angle producing said selected stroke angle, comprising, a. all the elements of claim 2 connected as therein described, and, b. a sixth link (19), equal in length to said third link (5), mechanically fastened at one end to said third link (5) around said axis (6) so that said sixth link (19) and said third link (5) form a single straight link, centered at and pivoting around said axis (6), c. a seventh link (18), equal in length to said fifth link (11), mechanically fastened at one end to said fifth link (11) around said axis (6) so that said seventh link (18) and said fifth link (11) form a single straight link, centered at and pivoting around said axis (6), d. an eighth link (12), equal in length to said first link (1), connected pivotally at one end to said first link (1) and said throw arm (7) at said second pivot (8), e. a ninth link (14), equal in length to said second link (3), connected pivotally at one end to an opposite end of said sixth link (19) at a fifth pivot (16), and, f. a tenth link (15), equal in length to said second link (3), connected pivotally at one end to an opposite end of said seventh link (18) at a sixth pivot (17), and connected pivotally at an opposite end to an opposite end of said ninth link (14) and an opposite end of said eighth link (12) at a seventh pivot (13).

4. I claim the invention of a link and pivot mechanism for providing opposing oscillating outputs relative to a continuous rotary input as described in claim 3, with the enhancement that the angular error of any selected stroke angle, due to uniformly non-perfect fitting pivots, will be the same as a similarly defined angular error for a second stroke angle, where the value of said second stroke angle is a 180 degree complement to the value of said selected stroke angle, comprising, a. all the elements of claim 3 connected as therein described, and, b. an eleventh link (20), a twelfth link (23), and a thirteenth link (22), all connected pivotally at one end to an eight pivot (21), all equal in length to said first link (1), the opposite end of said eleventh link (20) connected pivotally to said throw arm (7), said first link (1), and said eighth link (12) at said second pivot (8), the opposite end of said twelfth link (23) connected pivotally to said fourth link (9) and said fifth link (11) at said fourth pivot (10), and the opposite end of said thirteenth link (22) connected pivotally to said sixth link (19) and said ninth link (14) at said fifth pivot (16), and, c. a fourteenth link (24), a fifteenth link (25), and a sixteenth link (26), all connected pivotally at one end to a ninth pivot (27), all equal in length to said first link (1), the opposite end of said fourteenth link (24) connected pivotally to said first link (1), said eighth link (12), and said eleventh link (20) at said second pivot (8), the opposite end of said fifteenth link (25) connected pivotally to said second link (3) and said third link (5) at said third pivot (4), and the opposite end of said sixteenth link (26) connected pivotally to said seventh link (18) and said tenth link (15) at said sixth pivot (17).

* * * * *